Oct. 4, 1938.  H. N. OTT  2,132,122
MICROSCOPE
Filed July 26, 1935  3 Sheets-Sheet 1
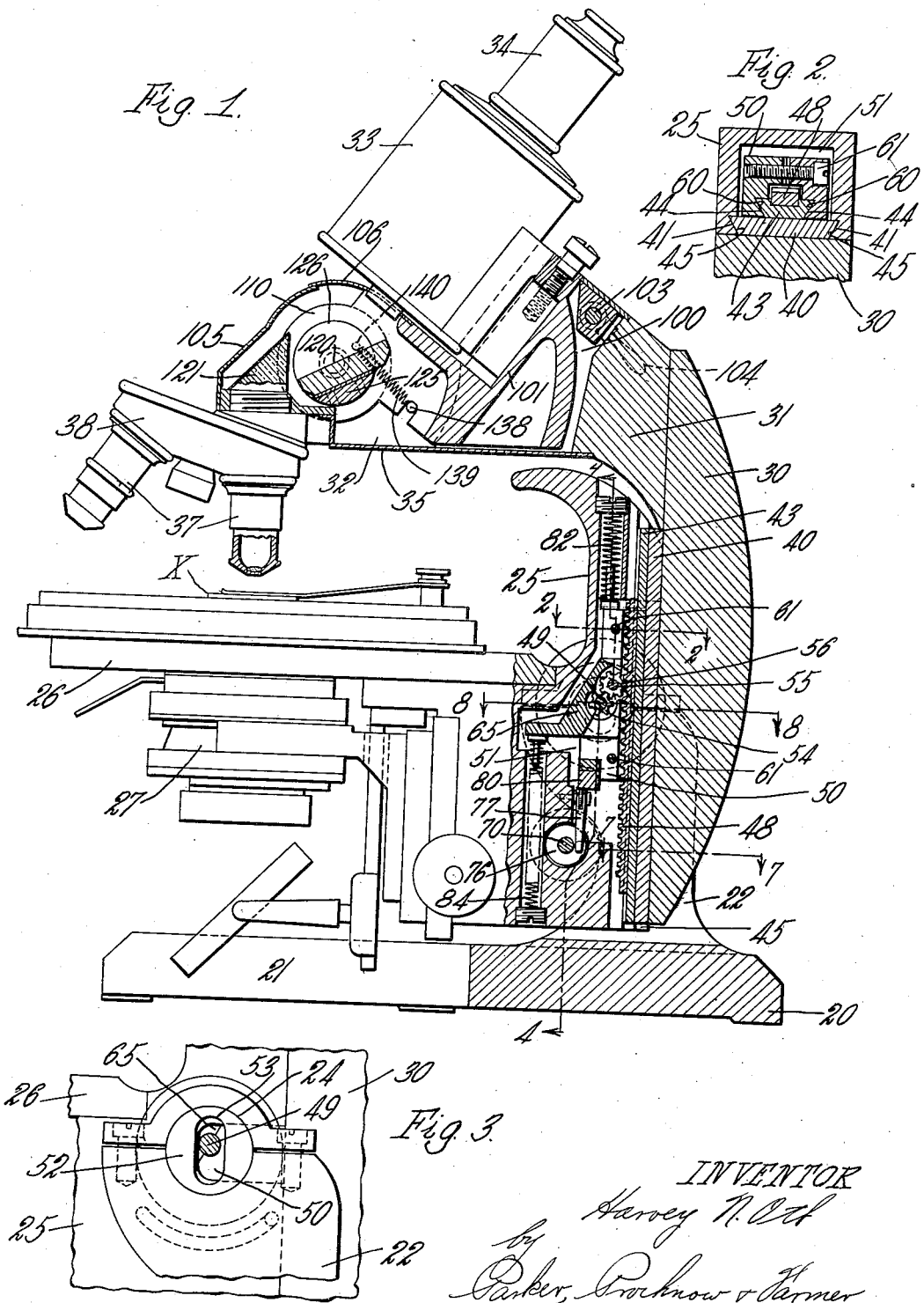
INVENTOR
Harvey N. Ott
by
Parker, Prochnow & Varner
ATTORNEYS

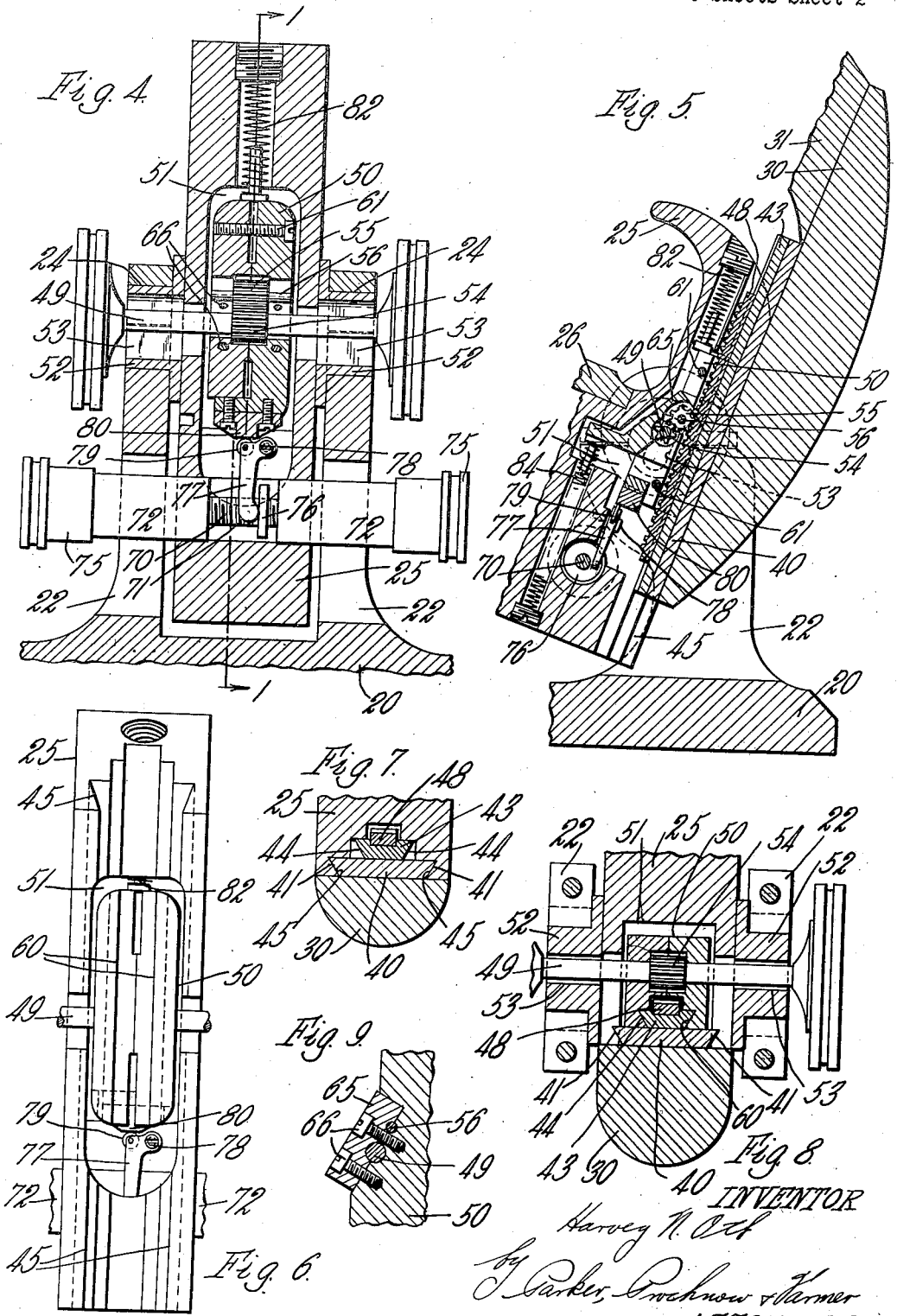

Oct. 4, 1938.　　　　　H. N. OTT　　　　　2,132,122
MICROSCOPE
Filed July 26, 1935　　　3 Sheets-Sheet 3
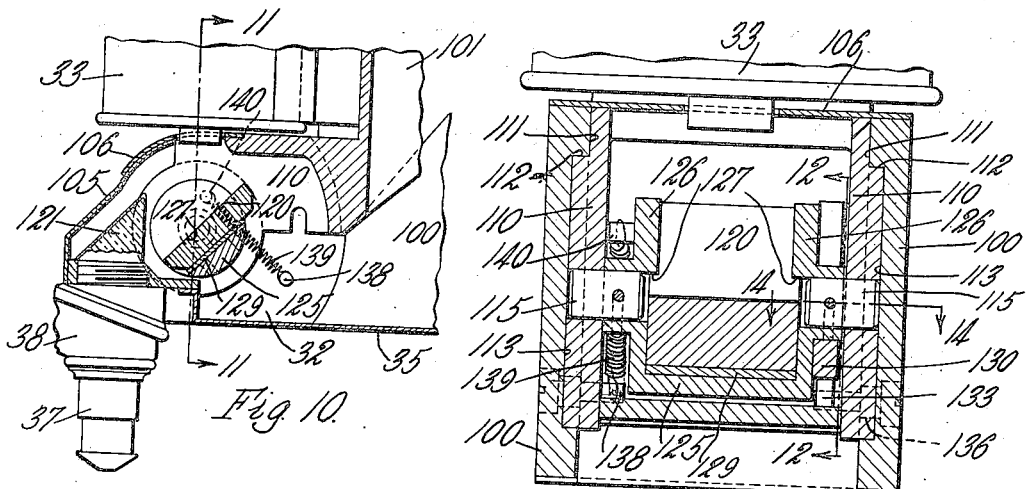
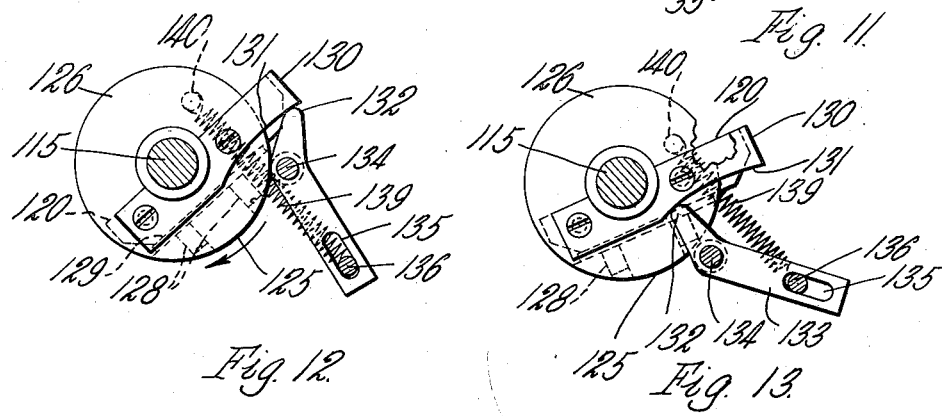
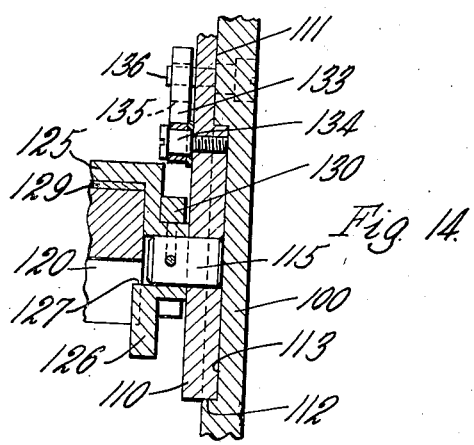
INVENTOR
Harvey N. Ott
By Parker, Prochnow & Larme
ATTORNEYS Patented Oct. 4, 1938

2,132,122

UNITED STATES PATENT OFFICE 2,132,122

MICROSCOPE

Harvey N. Ott, Buffalo, N. Y., assignor to Spencer Lens Company, Buffalo, N. Y.

Application July 26, 1935, Serial No. 33,221

3 Claims. (Cl. 88—39)

This invention relates to improvements in microscopes and refers particularly, to microscopes such as are disclosed in my copending application Ser. No. 423 filed Jan. 4, 1935.

My U. S. Patent #1,964,075 of June 26, 1934, as well as my copending application Serial No. 423, above mentioned, both show an instrument provided with an optical system including an objective, and a body tube is mounted in such a manner that the same, together with the ocular system mounted thereon, may be tilted or moved from an upright position to a position at a considerable angle to the vertical, or to the axis of the objective, or to any position between these two positions at the convenience of the user. Due to this arrangement, the optical system included a reflector which was movably mounted so that upon movement of the body tube or member the reflector moved through one-half of the angular displacement of the ocular system relatively to the axis of the objective. In this way, image forming rays received upon and diverted by said reflector continue to be directed along the optical axis of the body tube and ocular system in any angular position of the body tube or member.

Objects of the invention are to provide a microscope of this type in which the movable reflector is mounted and adjusted in an improved and simplified manner in relation to the movement of the body tube or member; also to construct a microscope having an improved pivotal mounting for enabling the body member to be placed in its different angular positions and which is of simple and practical construction, operates in an easy and smooth manner and provides large bearing or contact surfaces for affording long use with the minimum wear.

Other objects and advantages of this invention will be apparent from the following description of an embodiment thereof and from the appended claims.

In the drawings:

Fig. 1 is a side elevation, partly in section, of a microscope illustrative of this invention showing the body tube or member tilted to its extreme angular position, the section being taken approximately on the line 1—1, Fig. 4.

Fig. 2 is a fragmentary horizontal section of a part of the microscope taken on the line 2—2, Fig. 1.

Fig. 3 is a fragmentary side elevation showing the connections between the base of the instrument and the parts mounted thereon.

Fig. 4 is a transverse vertical section of the microscope taken approximately on the line 4—4, Fig. 1.

Fig. 5 is a fragmentary sectional elevation of the instrument similar to a portion of Fig. 1, but with the parts in a different position.

Fig. 6 is a face view of the supporting member of the instrument together with certain associated parts.

Fig. 7 is a fragmentary horizontal section taken on the line 7—7, Fig. 1.

Fig. 8 is a similar section, taken on the line 8—8, Fig. 1.

Fig. 9 is a fragmentary vertical section showing the means for rotatably mounting certain parts of the adjusting mechanism of the microscope.

Fig. 10 is a fragmentary longitudinal, vertical section, similar to that shown in Fig. 1, of a portion of the optical system of the instrument, but with the parts in a different position.

Fig. 11 is a transverse vertical section, on an enlarged scale, taken approximately on the line 11—11, Fig. 10.

Fig. 12 is a fragmentary vertical section of the reflector adjusting mechanism, taken approximately on the line 12—12, Fig. 11.

Fig. 13 is a similar section with the parts in a different position.

Fig. 14 is a fragmentary horizontal section, taken on the line 14—14 of Fig. 11.

The microscope shown in the drawings and illustrative of the invention is of the compound type and comprises in general a stand or base 20 including a conventional horse shoe foot 21 and a pair of spaced upwardly extending posts 22. Journalled upon and between the posts 22 for swinging movement about a transverse horizontal axis of an inclination joint 24 is a support or intermediate member 25 on which is mounted a stage 26 for supporting the specimen or object X to be examined, and below which may be arranged a condenser 27 movably supported upon the intermediate member 25 for adjustment toward and from the stage.

Slidably connected to the support or intermediate member 25 for movement in an up-and-down direction is an arm 30 at the upper end of which is secured a bracket 31, which carries the optical system of the microscope. This optical system may be of any suitable or desired kind and in the construction illustrated, the outer end of the bracket 31 has a hollow housing or chamber 32 secured thereto. A body tube or member 33 carrying an ocular system 34 of any suitable or usual construction, is in turn movably mounted at the upper front part of the housing 32. As will be seen upon reference to Figs. 1 and 10, this body tube 33, together with its eye piece 34 is adjustable in a fore-and-aft direction from an upright position, in which its axis and the axis of the ocular system extends vertically, to a position in which these axes are tilted rearwardly or towards the user of the instrument. The two views mentioned illustrate the extreme positions of the body tube 33 and eye piece 34 and these parts may be used in any intermediate position between these two extremes.

At the forward end of the bottom wall 35 of the housing, there is mounted an objective 37, the axis of which, when the parts are in the position shown in Fig. 10, extends vertically and forwardly of, or in a different plane to, but parallel with the then vertical axes of the body tube and eye piece. It will be seen by reference to Fig. 1, that in the tilting movements of the body member, the axes of the body member and that of the ocular system are shifted into angular relation to the axis of the objective. While in the drawings the objective 37 is shown as being supported upon a nose piece 38, which also supports other objectives in a manner to enable any one of the objectives carried by the nose piece to be moved into operative position, a single objective can be connected directly to the housing, if desired, as is well known in the art.

In order to provide for an accurate, smooth and durable adjustable mounting for the optical system relatively to the stage of the microscope, the adjustable arm is provided with a pair of parallel slidable connections in overlapping relation to each other, so that elongated bearing surfaces are provided. In the particular construction shown in Figs. 1 to 8, I provide on the forward or front face of the arm 30 a fixed slide or bearing section 40, which is in the form of the usual dove-tailed bar having opposite parallel, bevelled side edges 41, and upon the front face of this bearing member 40 is secured, in turn, a second bearing member or dove-tailed slide bar 43 having opposite, parallel bevelled side edges 44. The bar 43 is narrower than the bar 40 so that the bevelled edges 44 of the former lie within the bevelled edges 41 of the bar 40. The parallel bevelled edge portions 41 of the bar 40 are slidably engageable in bevelled guide grooves 45 formed in and extending lengthwise of the rear upright face of the intermediate member or support 25. As shown in the drawings, the bars or bearing members 40 and 43 are of considerable length and approximately equal to the length of the guide grooves 45 in the support 25.

Secured to the front face of the bearing member or bar 43 is a vertical rack bar 48 which forms part of the coarse adjusting mechanism of the instrument. The coarse adjusting mechanism further includes a transverse horizontal and rotatable operating shaft 49 which is journalled in a floating member or block 50, which is arranged in a cavity or recess 51 in the support 25 and which is open at the rear face of the latter. The shaft 49 has its opposite ends extended outwardly through the trunnions or journals 52 of the inclination joint 24 beforementioned, knobs being secured to the ends of the shaft for turning it. The trunnions 52 are formed with vertical slots 53, see Fig. 3, which enable the shaft 49 to have a limited up-and-down movement with reference to the inclination joint for the purpose to be explained.

Intermediate of its ends and within a recess in the floating member or block 50, the shaft 49 is provided with a pinion 54, which meshes with a pinion 55 also disposed in said recess and which is fixed upon a short horizontal shaft 56 journalled in the floating member 50 in parallel relation to the shaft 49. This pinion 55 operatively engages or meshes with the rack bar 48 before mentioned. By appropriate manipulation of the knobs or hand wheels of the shaft 49, the pinions 54 and 55 may be rotated to shift the arm 30 up and down in its guides 45 in the support 25. The pinion 55 is provided merely as an idler so as to obtain an upward movement of the arm 30 by the usual conventional clockwise rotation of the shaft 49, and a downward movement of the arm 30 by a counterclockwise rotation of said shaft 49.

As shown in the drawings, and particularly in Fig. 6, the floating member or block 50 has formed in its rear upright face and for the entire length of the block, a pair of opposed bevelled guide groves 60 and these guide grooves are formed to slidably receive the bevelled edges 44 of the bearing member or bar 43 beforementioned. The floating member or block 50, as shown, is preferably split in a vertical direction and secured together by screws 61, Figs. 1 and 2, in a manner to force the bevelled guide grooves 60 into firm gripping engagement with the bevelled edges 44 of the dove-tailed bar 43. Also by splitting the floating member in the manner described, the pinions 51 and 55 can be arranged in their recess in this member. The sides of the recess engage the ends of the pinions so as to prevent endwise movement of the pinions and the shafts to which they are attached. As shown in Fig. 9, the two shafts 49 and 56 can be removably mounted in the member 50 by means of a detachable plate or cap 65 secured to the member 50 by screws 66. The inner face of the cap 65 is formed with half round horizontal transverse grooves which are complementary to similar grooves in the adjacent face of the member 50 so as to thereby form bearings for the shafts 49 and 56. These shafts, however, could be journalled in the member 50 in any other suitable manner.

In the arrangement as thus far described, actuation of the coarse adjusting shaft 49 provides a relative movement of the arm 30 and its bearing members or bars 40 and 43 relatively to the support 25 and also relatively to the floating member or block 50.

To effect a fine adjustment of the arm 30 and the optical system carried thereby, I provide means by which a limited up-and-down movement is imparted to the floating member or block 50 relatively to the stationary support or intermediate member 25, in which case the bearing member 43 is shifted with the guide grooves 60 of the floating member 50, because of frictional gripping by the floating member of the dove-tailed bearing member 43.

Any suitable adjusting mechanism may be provided for effecting this result, that shown being of well known conventional form, including a transverse horizontal shaft 70 provided with fine threads 71. The shaft 70 is mounted in and has threaded engagement with a hollow horizontal bearing sleeve 72 fixed in the intermediate member or support 25. The shaft is further provided at its extremities with operating knobs or members 75, by turning which the shaft is moved lengthwise in and relatively to the sleeve 72. Intermediate of its ends, the shaft 70 is provided with a fixed disk 76 against which the lower end of a lever 77 engages. This lever 77 is arranged in the cavity 51 of the support 25, and is mounted upon a stud or pivot 78. The lever is provided laterally of the stud 78 with a roller 79 which abuts against a bearing face 80 at the lower end of the floating member 50. Arranged in a vertical bore in the support 25 and adjacent the upper end of the floating member 50, there is an expansion spring 82 which yieldingly bears upon and urges the floating member 50 in a downward direction so as to hold the lower bearing face 80 thereof in firm engagement with the roller 79 of the fine adjusting mechanism, and through this arrangement, the lower end of the lever 77 is held in engagement with the disk 76 on the shaft 70. Preferably, a second expansion spring 84 mounted in a bore in the support 25 bears upwardly against a face or shoulder of the floating member 50. This spring 84 is slightly weaker than the spring 82, but nevertheless acts to counterbalance to a considerable extent the weight of the parts so that the member 50 is yieldingly or floatably supported relatively to the member 25. The spring 82, nevertheless, acts with sufficient pressure upon the member 50 to maintain proper contact between its lower bearing face 80 and the roller 79 at all times.

It will be apparent that appropriate manipulation of the knobs 75 will rotate and cause endwise movement of the shaft 70 in one direction or another with a resultant upward or downward movement of the floating member 50. When so actuated the floating member 50 will, through the engagement of its guide grooves 60 with the bevelled edges 44 of the bearing member 43, effect a direct movement in one direction or another, as a unit, of the floating member 50, the arm 30, and the shafts 51 and 56 of the coarse adjusting mechanism. The pinions 54 and 55 will in such movement rotate relatively to the rack bar 48.

By means of the construction described the movable arm 30 is provided with unusually long bearing connections, not only with the support 25, but also with the floating member 50, since both of these members have guide grooves extending throughout approximately their entire length for the reception of the long bearing members 40 and 43 on the arm 30. Obviously, such an advantage could not be obtained in instruments provided with only one bearing or dove-tailed member for the reasons heretofore explained. The present construction, however, provides adequate firm and smoothly operating bearing connections between the arm and the members 25 and 50, so that looseness, wobbling, or binding as a result of the weight carried by the arm 30 is overcome or reduced to a minimum. Furthermore, these results are arrived at by the use of the minimum number of parts which are of relatively simple and inexpensive construction.

The housing 32 beforementioned includes in addition to the bottom wall 35, a pair of spaced vertical and parallel side walls 100. The body tube or member 33 has detachably secured to it a tail piece 101 formed with opposite vertical flat faces which engage between the side walls 100 of the housing 32. In order to secure the body member 33 in any of the different positions required, a clamp 103 is provided, which includes a handle 104, which when turned in the proper direction, tends to force the side walls 100 into firm gripping contact with the side faces of the tail piece 101. When it is desired to shift the body member 33 into another position, the clamp 103 is released, the body member adjusted as required, and the clamp again tightened to hold the body member in the new position. The foregoing securing means for the body tube 33 is well known, and further detailed description is unnecessary. The housing 32 is completed by a fixed transverse wall 105 and a wall or plate 106 which is secured to and is movable with the body tube or member 33 and overlaps the wall 105.

The body member 33 is movably and rotatably connected to the housing to effect the angular adjustments described by providing at the lower end of the body tube 33 a pair of parallel spaced side pieces or members 110, which form in effect forward extensions of the tail piece 101. The outer parallel faces 111 of the pieces 110, see Fig. 11, are so spaced as to slidably engage the inner faces of the side plates 100 of the housing 32, and preferably the pieces or extensions 110 are provided with outwardly extending circular bearing disks or portions 112, of relatively large diameter, which fit in complementary recesses 113 in the side walls 100 so that when the body tube or member is shifted into different positions, the lateral extensions 112 will turn in the recesses 113. In this way, a very simple, smooth and steady rotatable mounting for the body tube 33 is provided.

Extending inwardly from each of the side pieces 110 of the body tube or member is a short stud or pivot 115. These pivots 115 are horizontally alined and are disposed upon the axis of rotation of the bearing extensions 112 and upon these studs 115 is supported a suitable reflector 120, preferably of the first surface type, in such a way that its reflecting face is disposed angularly crosswise of and upon the optical axis of the ocular system 34, and through which axis the axis of rotation of the body tube also passes transversely.

Within the housing 32 and upon the optical axis of the objective 37 is mounted a fixed reflecting element or prism 121 having a reflecting face arranged at 45 degrees to the axis of the objective 37 and disposed so as to receive image forming rays passing upwardly from the objective 37 and divert them in a horizontal direction toward the axis of the body tube 33 and ocular system 34. The reflecting element 120 before mentioned, is disposed so as to intercept the rays reflected from the element 121 and divert them along the axis of the body tube 33 to the oculars 34 in all angular positions in which the latter may be adjusted, in use, with respect to the axis of the objective 37. Accordingly the reflecting face of the element 120 must move with the movements of the body tube or member, but only through half the angular displacement of the latter. In the position shown in Fig. 10, it will be seen that the axis of the body tube 33 and the ocular 34 is disposed in a vertical direction and the reflecting face of the element 120 extends at an angle such as to direct rays from the reflecting element 121 upwardly into the body tube and the ocular system. Referring now to Fig. 1, it will be seen that while the body tube 33 and eye piece 34 have been moved through a certain angle, the reflecting face of the element 120 has been moved only through half that angle so that the rays diverted thereby still pass along the axis of the body tube 33 and ocular 34.

For permitting this relative movement of the reflecting member 120, I mount said element in a saddle or support 125 which is of substantially U-shaped cross section, and the side members 126 of which are disposed between and adjacent the side pieces 110 and are secured upon the studs 115 beforementioned. The opposite side members 126 of the saddle 125 may, if desired, be of circular cross section having undercut faces or shoulders 127 which engage upon the upper or reflecting face of the element 120. This element is maintained in engagement with said shoulders 127 by screws extending through the cross piece 128 of the saddle, and which engage and force a pad or cushion 129 against the underface of the reflecting member 120. Any other means for mounting the reflecting member in movable relation to the objective and ocular may, of course, be employed.

In order to produce the desired relative movement of the reflector to the body tube, I preferably employ a simple and accurate mechanism, including a cam part and a part cooperating therewith, one of these parts being moved by the relative movement of the body tube with reference to a fixed support. Any suitable mechanism of this kind may be used, and in the construction shown, a lever is provided which is moved by the relative movement of the body tube and a stationary support therefor, and which cooperates with a cam face formed on the support for the reflector.

As shown particularly in Figs. 11 to 14, I form on or secure to the outer side of one of the side members 126 of the saddle 125, a cam plate or part 130 having on its bottom edge a cam or curved surface 131 against which the free end or nose 132 of an actuating lever 133 is yieldingly engageable. The lever 133 is mounted between its ends upon a horizontal pivot 134, which is secured in and projects from one of the side pieces or extensions 110 of the body tube or member 33 as shown in Fig. 14. The opposite end of the lever 133 is provided with a slot 135 which receives a fixed pin 136 projecting inwardly from the adjacent side wall 100 of the housing 32. A second pin 138 secured in and projecting from the opposite side wall 100 of the housing 32 and in line with the pin 136 receives one end of a tension spring 139. The other end of this spring is secured upon a pin or projection 140 projecting laterally from one of the side members 126 of the saddle 125, thus acting through the saddle 125 to yieldingly hold the cam face 131 of the cam plate 130 in contact with the nose or end 132 of the lever 133.

The position of the parts shown in Fig. 12 corresponds with that shown in Fig. 10, and in the movement of the body tube 33 from the position shown in Fig. 10 to that shown in Fig. 1, the pivot 134 of the lever 133 is carried about the axis of the studs 115 in the direction of the arrow shown in Fig. 12 to the position shown in Fig. 13. However, since the slotted end of the lever 133 is restrained by the fixed pin 136, the lever 133 during the aforesaid movement of its pivot 134 will swing about its pivot across or along the cam face 132 and acting against the pull of the spring 139 will cause the reflecting member 120 to move through only half the angle through which the body tube 33 has been moved. The form and curvature of the cam face 131 is such that during these movements or any intermediate movements, the reflecting face of the element 120 is moved to a uniform extent or in constant ratio with that of the body tube 33 thereof continuing to rays reflected therefrom along the optical axis of the member 33 and ocular 34 at all times.

As above described, the desired adjustment of the reflecting element 120 relatively to the body member is effected by mechanism of simplified and practical construction, the movement of the body member being transmitted in the desired ratio to the reflecting element 120 by a single interposed member, namely, the lever 133 which acts directly on the cam face 131 which is formed on or carried by the reflecting element. Furthermore, the provision of the relatively large diameter bearings 120 on the body tube which interfit with parts on the walls of the housing 32 provides large, smoothly operating bearings or pivotal connections which can be accurately formed and smoothly machined or finished, and afford a steady movement of the body member, and owing to the relatively large area of contact of the bearings, wearing of the parts is reduced to a minimum and a vastly superior rotary connection is provided as compared with constructions in which the parts are pivotally connected merely by shafts or studs of small diameter.

I claim as my invention:

1. In an optical instrument, the combination of an objective, a body member movable relatively to said objective and carrying an ocular system, a relatively stationary frame including a pair of walls having opposed circular bearing recesses of relatively large diameter formed therein, a pair of spaced circular bearing sections on said body member fitting in said bearing recesses and forming therewith a pivotal mounting of adequate size for said body member to enable the same to be turned into different angular relations to said objective, a reflector disposed between said body member bearing sections, oppositely extending pivots on said reflector which are journalled in said bearing sections with their axes coincident with the axes of said sections, and an actuating member movably mounted on said body member and having a part operatively connected to said relatively stationary frame, said member being actuated by pivotal movements of said body member to engage and turn said reflector upon its pivots through one-half the angular displacement of said body member and ocular system relatively to said objective.

2. In an optical instrument, an objective, a frame, a body member having a pivot by which it is mounted on said frame so that said body member may swing on said frame within a prescribed range into different operative angular adjustments to said objective, an optical system on said body member, a movable reflector unit having a reflecting face disposed crosswise of and upon the axis of said ocular system in position to receive image rays from said objective and direct them along said axis of said optical system, a pivot supporting said reflector unit and having its axis coincident with that of said body member pivot, a cam face on said reflector unit, a lever having a pivot between its ends mounted on said body member at a distance from the axis of said body member pivot so that said lever pivot will be carried about said latter pivot axis in the range of movements of said body member, said lever having an end abutting said cam face, a stationary part with which the other end of said lever is connected so that, as said body member moves about its pivot in said angular adjustments thereof said latter end of said lever will be restrained and said lever will swing upon its pivot as the latter moves about said body member pivot and the other end of said lever will actuate said reflector unit through its engagement with said cam thereon to shift said reflecting face about said reflector pivot through one half the angular displacement of said body member and its optical system, so that image rays from said objective will be directed by said reflecting face along said optical system axis in the various angular adjustments of said body member within its prescribed range of movement.

3. In an optical instrument, an objective, a frame, a body member having a pivot by which it is mounted on said frame so that said body member may swing on said frame within a prescribed range into different operative angular adjustments to said objective, an optical system on said body member, a movable reflector unit having a reflecting face disposed crosswise of and upon the axis of said ocular system in position to receive image rays from said objective and direct them along said axis of said optical system, a pivot supporting said reflector unit and having its axis coincident with that of said body member pivot, a cam face on said reflector unit, a lever pivotally mounted on said body member and having an arm engaging said cam face, a stationary pin, a second arm on said lever having a slot which receives said stationary pin, and said lever, when said body is swung about its pivot, being swung about its pivot by such movement by reason of the slotted connection of its second arm with said pin, whereby the other arm of said lever moves along said cam face and progressively changes its relation thereto in such movement, resulting in the shifting of said reflector unit and the movement of its reflecting face through one half the angular displacement of said body member.

HARVEY N. OTT.